United States Patent [19]
Jacobs et al.

[11] Patent Number: 6,052,294
[45] Date of Patent: Apr. 18, 2000

[54] POWER SUPPLY SNUBBER RESET CIRCUIT

[75] Inventors: Mark E. Jacobs, Dallas; Rui Liu, Plano; Hengchun Mao, Dallas, all of Tex.

[73] Assignee: Lucent Technologies Inc., Murray Hill, N.J.

[21] Appl. No.: 09/152,558

[22] Filed: Sep. 14, 1998

[51] Int. Cl.[7] .................................................. H02H 7/125
[52] U.S. Cl. ............................................. 363/53; 363/126
[58] Field of Search ................................ 363/50, 52, 53, 363/125, 126

[56] References Cited

U.S. PATENT DOCUMENTS

| | | | |
|---|---|---|---|
| 4,611,267 | 9/1986 | McMurray | 363/58 |
| 4,977,493 | 12/1990 | Smith | 363/53 |
| 5,351,179 | 9/1994 | Tsai et al. | 363/126 |
| 5,414,613 | 5/1995 | Chen | 363/52 |
| 5,636,114 | 6/1997 | Bhagwat et al. | 363/56 |
| 5,731,966 | 3/1998 | Liu | 363/53 |
| 5,815,386 | 9/1998 | Gordon | 363/50 |
| 5,828,559 | 10/1998 | Chen | 363/56 |
| 5,877,947 | 3/1999 | Chen et al. | 363/53 |
| 5,898,581 | 4/1999 | Liu | 363/53 |
| 5,923,547 | 7/1999 | Mao | 363/52 |

OTHER PUBLICATIONS

"Novel Zero–Voltage and Zero–Current Switching (ZVZCS) Full Bridge PWM Converter Using a Simple Auxiliary Circuit" by Jung G. Cho, Ju W. Baek, Chang Y. Jeong, Dong W. Yoo, Hong S. Lee and Geun H. Rim; 1998 IEEE; pp. 834–839.

"A 48V, 1.5kW, Front–end Zero–Voltage Switched, PWM Converter with Lossless Active Snubbers for Output Rectifiers" by Dhaval B. Dalal and Fu–Sheng Tsai; pp. 722–728; Aug. 1998.

"An Improved ZVZCS PWM FB DC/DC Converter Using Energy Recovery Snubber" by Eun–Soo Kim, Kee–Yeon Joe, Moon–Ho Kye; Yoon–Ho Kim, Byung–Do Yoon; 1997 IEEE; pp. 1014–1019.

*Primary Examiner*—Jeffrey Sterrett

[57] ABSTRACT

For use in a power supply having a rectifying diode and a snubber circuit that includes a snubber inductor for absorbing a portion of a reverse recovery current associated with the rectifying diode, a circuit and method for resetting the snubber inductor and a power supply employing the circuit and method. In one embodiment, the circuit includes a reset capacitor, coupled to the snubber inductor, that has sufficient capacity to impress a resetting voltage across the snubber inductor. The circuit also includes an activation circuit, coupled between the reset capacitor and an output of the power supply, that creates a voltage differential between the reset capacitor and the output to allow the reset capacitor to attain the resetting voltage.

27 Claims, 6 Drawing Sheets

POWER SUPPLY SNUBBER RESET CIRCUIT

TECHNICAL FIELD OF THE INVENTION

The present invention is directed, in general, to power conversion and, more specifically, to a reset circuit for use with a snubber circuit, a method of resetting a snubber inductor of a snubber circuit and a power supply employing the snubber and reset circuit and method.

BACKGROUND OF THE INVENTION

The use of DC—DC power converters is wide spread in many important industries including those associated with larger telecommunication and computer installations. These units are often expected to operate reliably over a variety of load and temperature conditions. These converters transform an input DC is voltage by converting it first to an AC signal, typically passing it through a transformer and then rectifying it to provide the desired value of output DC voltage. The use of switching techniques allows the power density of these converters to be increased.

A major problem area with high frequency, high power DC—DC converters revolves around a reverse recovery current condition associated with the power rectifiers that occurs during a turn-off transition and the resulting switching losses associated with this effect. High frequency operation of the switching devices of the DC—DC converter allows the use of smaller energy storage elements and filtering components (such as transformers, inductors and capacitors) in the converter. As the switching frequency of the switching devices is pushed even higher to increase the converter power density, the reverse recovery condition associated with the power rectifiers becomes more severe. A significant reverse recovery current may, at worst, damage or destroy the power rectifiers and, at best, contribute to poor power conversion efficiency.

Other problems arise when high blocking voltage rated switching devices are required. The cost of the high blocking voltage rated switching devices is much higher than the lower voltage rated switching devices. Additionally, the higher voltage rated devices exhibit higher forward conduction voltage drops than the lower voltage rated devices which makes them more lossy and therefore less efficient overall.

To deal with these problems, various passive and active snubber circuits have been developed to address and compensate for these undesirable qualities. Some of these snubber circuits are very complicated and difficult to implement. Many have high losses themselves and therefore contribute to lower converter efficiency which, while offering protection to the power rectifiers, just transfers much of the overall power loss to the snubber circuit.

Among the snubber circuits developed, the energy recovery snubber circuit with reduced turn-off loss is one of the more attractive operationally. The energy recovery snubber circuit, however, may require several additional circuit components which often makes the circuit layout challenging in terms of minimizing stray inductance. Stray inductance causes spurious "ringing" at switching transition times which often significantly increases the voltage stresses on the power rectifiers if left uncompensated. Furthermore, limiting the diode reverse recovery current too severely will not allow the circuit to function properly.

Another snubber circuit design is the resonant, passive snubber circuit. This snubber circuit was developed preferably for transformer isolated converters to protect the power rectifiers from excessive voltage stress produced from the energy stored in the leakage inductance of the power transformer during a power rectifier turn-off transition.

Most DC—DC converters are expected to operate properly over widely varying values of load current. Many DC—DC converters are designed to supply up to a rated value of load current while maintaining a highly regulated voltage output. As the load current increases beyond this value, the output voltage decreases up to some point at which the output voltage is driven to zero to protect the converter from heat induced failure. Passive snubber circuits, however, which are designed to protect the power rectifiers from too large a reverse voltage, may no longer operate properly as the output voltage decreases causing permanent component failures especially of the power rectifiers.

Accordingly, what is needed in the art is a way to isolate critical snubber circuit components from the effects of an operating converter output voltage that may become too low to maintain proper snubber circuit operation.

SUMMARY OF THE INVENTION

To address the above-discussed deficiencies of the prior art, the present invention provides for use in a power supply having a rectifying diode and a snubber circuit that includes a snubber inductor for absorbing a portion of a reverse recovery current associated with the rectifying diode, a circuit and method for resetting the snubber inductor and a power supply employing the circuit and method.

In one embodiment, the circuit includes a reset capacitor, coupled to the snubber inductor, that has sufficient capacity to impress a resetting voltage across the snubber inductor. The circuit also includes an activation circuit, coupled between the reset capacitor and an output of the power supply, that creates a voltage differential between the reset capacitor and the output to allow the reset capacitor to attain the resetting voltage.

The present invention introduces the broad concept of providing a reset capacitor and an activation circuit coupled to a snubber inductor that presents enough voltage differential to reset the snubber inductor for all power supply output voltage conditions. For purposes of the present invention, "activation circuit" is broadly defined as any circuit element or collection of circuit elements that establish a voltage differential between the snubber inductor and the power supply output voltage.

In one embodiment of the present invention, the activation circuit includes a resistor. Normal snubber circuit operation directs a current through the resistor to establish a voltage of sufficient magnitude to properly reset the snubber inductor. In an alternate embodiment of the present invention, the activation circuit includes a parallel-coupled resistor and bypass switch. The bypass switch, which is closed during normal power supply operation, raises the power supply operating efficiency and opens during periods of lower output voltage operation to assure proper snubber inductor resetting. Those skilled in the art should appreciate that any device (such as a zener diode) that can provide a voltage drop and pass a current may also be employed in the activation circuit.

In one embodiment of the present invention, the snubber circuit further includes a snubber capacitor that recovers energy stored in the snubber inductor to the output. In an alternate embodiment of the present invention, the snubber circuit includes a plurality of snubber capacitors that recover energy stored in the snubber inductor to the output.

In one embodiment of the present invention, the snubber circuit further includes first and second snubber diodes coupled to the snubber inductor. These snubber diodes direct the flow of current within the snubber circuit.

In one embodiment of the present invention, the power supply further includes a plurality of rectifying diodes and the snubber circuit moderates reverse recovery currents associated with the plurality of rectifying diodes. Those skilled in the art are familiar with the structure and function of rectifying diodes.

In one embodiment of the present invention, the power supply further includes an output capacitor coupled to the output. The activation circuit creates the voltage differential between the reset capacitor and the output capacitor.

The foregoing has outlined, rather broadly, preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, reference is now made to the following descriptions taken in conjunction with the accompanying drawings, in which.

DETAILED DESCRIPTION

Figure 1:
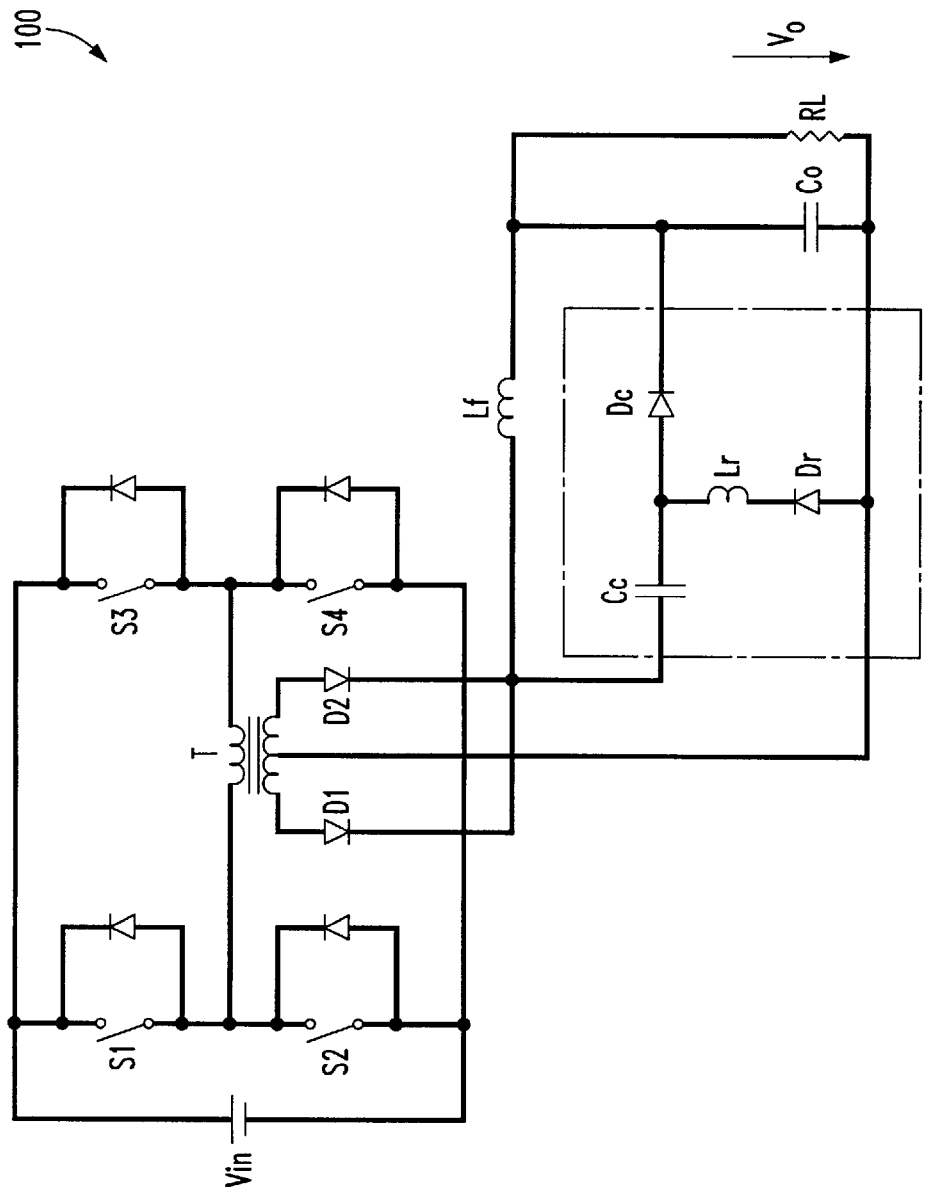
FIG. 1 illustrates a power converter that employs a snubber circuit to recover some of the rectifier reverse recovery energy.

Referring initially to FIG. 1, illustrated is a power converter 100 that employs a passive snubber circuit to recover some of the rectifier reverse recovery energy. The power converter 100 includes an input inverter circuit including first, second, third and fourth switches S1, S2, S3, S4, respectively, a power transformer T, first and second rectifying diodes D1, D2, a filter inductor Lf, an output capacitor Co, a load resistor RL and a passive snubber circuit. The passive snubber circuit includes a snubber capacitor Cc, a snubber inductor Lr, a first snubber diode Dr and a second snubber diode Dc.

The rectifying diodes D1, D2 form a full wave rectifier, where one of the rectifying diodes (e.g., the first rectifying diode D1) is typically conducting every half cycle during normal operation. As the conducting rectifying diode D1 commutates from the ON state to the OFF state, there is a brief period of time in which it remains conducting while the excess current carriers in the device are swept away from its junction. Consequently, a reverse current flows through the rectifying diode D1 for a short duration. Additionally, during this period, the rectifying diodes D1, D2 simultaneously conduct for a brief period of time and energy is stored in the leakage inductance of the power transformer T. When the commutation period of the rectifying diode D1 ends, its junction capacitance attempts to resonate with the leakage inductance of the power transformer T. Without the presence of the passive snubber circuit, a reverse voltage often between two and four times normal would be imposed across the rectifying diode. The passive snubber circuit absorbs most of this energy and moderates this value of peak reverse voltage.

Proper operation of the passive snubber circuit requires that the snubber capacitor Cc maintain its charge balance and the current in the snubber inductor Lr be reset to zero during each cycle of operation. Failure to accomplish this results in the snubber circuit becoming ineffective due to possible saturation of the snubber inductor Lr. The power converter 100 is typically designed to deliver a rated current to the load in a continuous manner. Load currents beyond the rated value typically cause the output voltage to decrease and reach a point where the output voltage diminishes to zero as the load current demand continues to increase (e.g., as would be the case for a shorted output). There is a point at which a reduced output voltage will not provide enough reverse electromotive force to reset the current in the snubber inductor Lr during a cycle, thereby causing it to eventually saturate. Consequently, the snubber circuit will not be able to fulfill its intended purpose leading to increased reverse voltages across the rectifying diodes D1, D2 resulting in their possible failure. Of course, the operation and efficiency of she power converter 100 suffers as a result.

Figure 2:
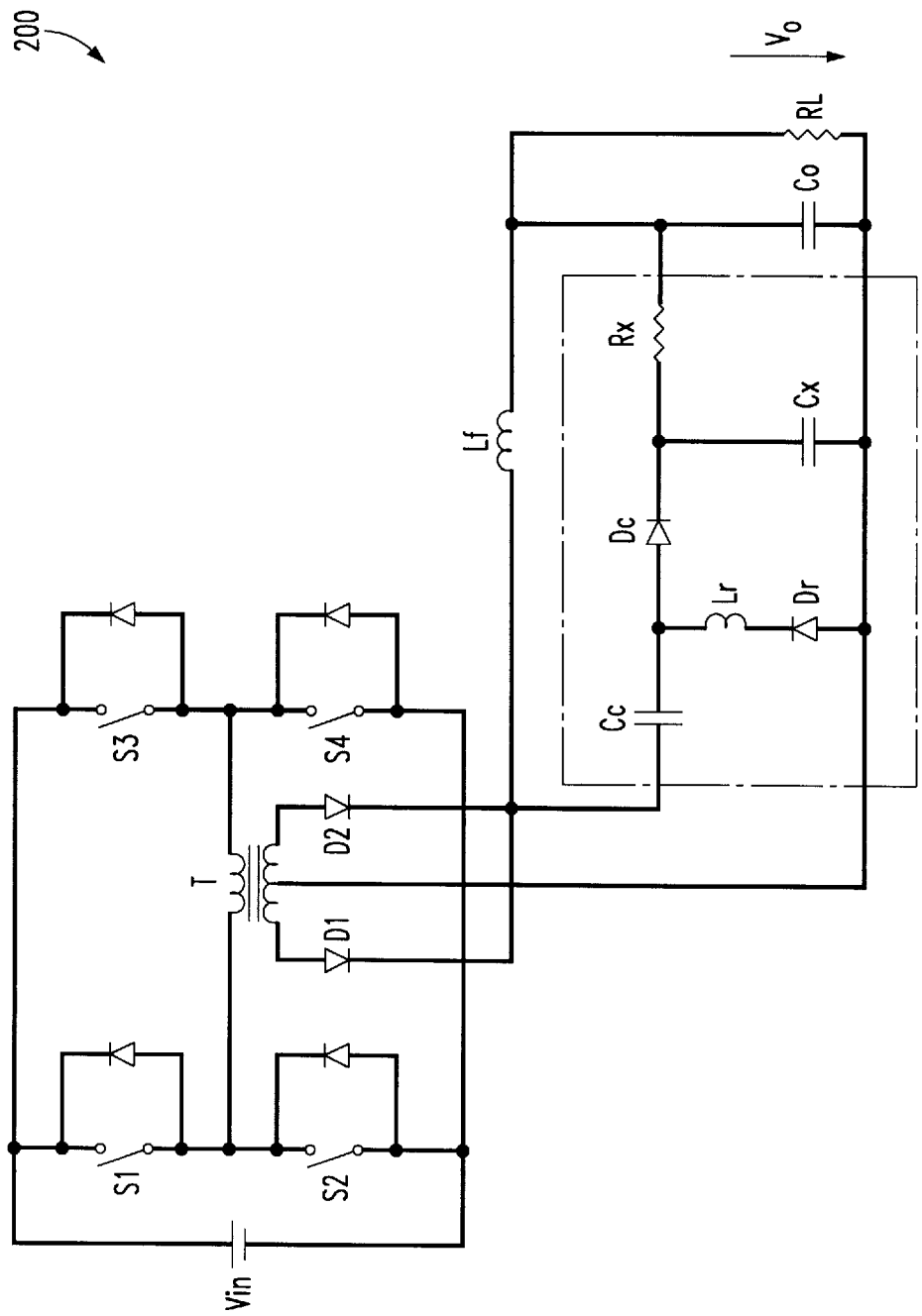
FIG. 2 illustrates a power converter with a snubber circuit and employing a reset circuit constructed according to the principles of the present invention.

Turning now to FIG. 2, illustrated is a power converter 200 with a snubber circuit and employing a reset circuit constructed according to the principles of the present invention. The power converter 200 includes an input inverter circuit including first, second, third and fourth switches S1, S2, S3, S4, respectively, a power transformer T, first and second rectifying diodes D1, D2, a filter inductor Lf, an output capacitor Co, a load resistor RL and a passive snubber circuit. The passive snubber circuit includes a snubber capacitor Cc, a snubber inductor Lr, a first snubber diode Dr and a second snubber diode Dc. The power converter 200 also includes a reset circuit including a reset capacitor Cx and an activation circuit including an activation circuit resistor Rx.

When the power converter 200 enters a transitional period (e.g., the first and third switches S1, S3, transition to a conducting state and the second and fourth switches S2, S4, transition to a nonconducting state or visa verses), both of the rectifying diodes D1, D2 conduct for a period of time and the snubber capacitor Cc and the snubber inductor Lr resonate to transfer energy from the snubber capacitor Cc to the snubber inductor Lr. If the first rectifying diode D1 is commutating on (i.e., turning ON) and the second rectifying diode D2 is commutating off (i.e., turning OFF), the second rectifying diode D2 will continue to conduct due to a reverse recovery condition as stated above. During this reverse recovery period, the current in the winding of the power transformer T connected to the incoming first rectifying diode D1 increases above the output current in the filter inductor Lf. At the end of the reverse recovery time, the second rectifying diode D2 abruptly turns OFF.

At this point, part of the current flowing through the first rectifying diode D1 will flow through the filter inductor Lf, and the remaining current conducted by the second rectifying diode D2 flows through the passive snubber circuit. Most of the reverse recovery energy stored in the leakage inductance of the power transformer T is recovered into the snubber capacitor Cc and the reset capacitor Cx and is transferred to the output of the power converter 200 through the activation circuit resistor Rx.

Additionally, the current in the snubber inductor Lr will be diverted to the reset capacitor Cx through the second snubber diode Dc and will diminish to zero allowing the snubber inductor Lr to maintain its volt-second balance and to be completely reset. Selection of a proper value for the activation circuit resistor Rx assures that the voltage across the reset capacitor Cx is always sufficient to allow the current through the snubber inductor Lr to reset to zero. This occurs even if the power converter 200 output voltage falls to zero. While the power loss associated with the activation circuit resistor Rx may be small during normal operation (when the output voltage is within regulation), the overall efficiency of the power converter 200 improves by applying the reset circuit in conjunction with the snubber circuit in the power converter 200. Those skilled in the art should understand that the activation circuit resistor Rx may be replaced with other devices (such as a zener diode) capable of providing a voltage drop and passing a current.

When one or both conducting switches in the primary circuit are turned OFF, the transformer T voltage becomes virtually zero, and both of the first and second rectifying diodes D1, D2 start to conduct current effectively shorting the transformer T secondary winding. During this process, the snubber capacitor Cc resonates with the snubber inductor Lr thereby maintaining the charge balance of the snubber capacitor Cc and transferring energy from the snubber capacitor Cc to the snubber inductor Lr.

Figure 3:
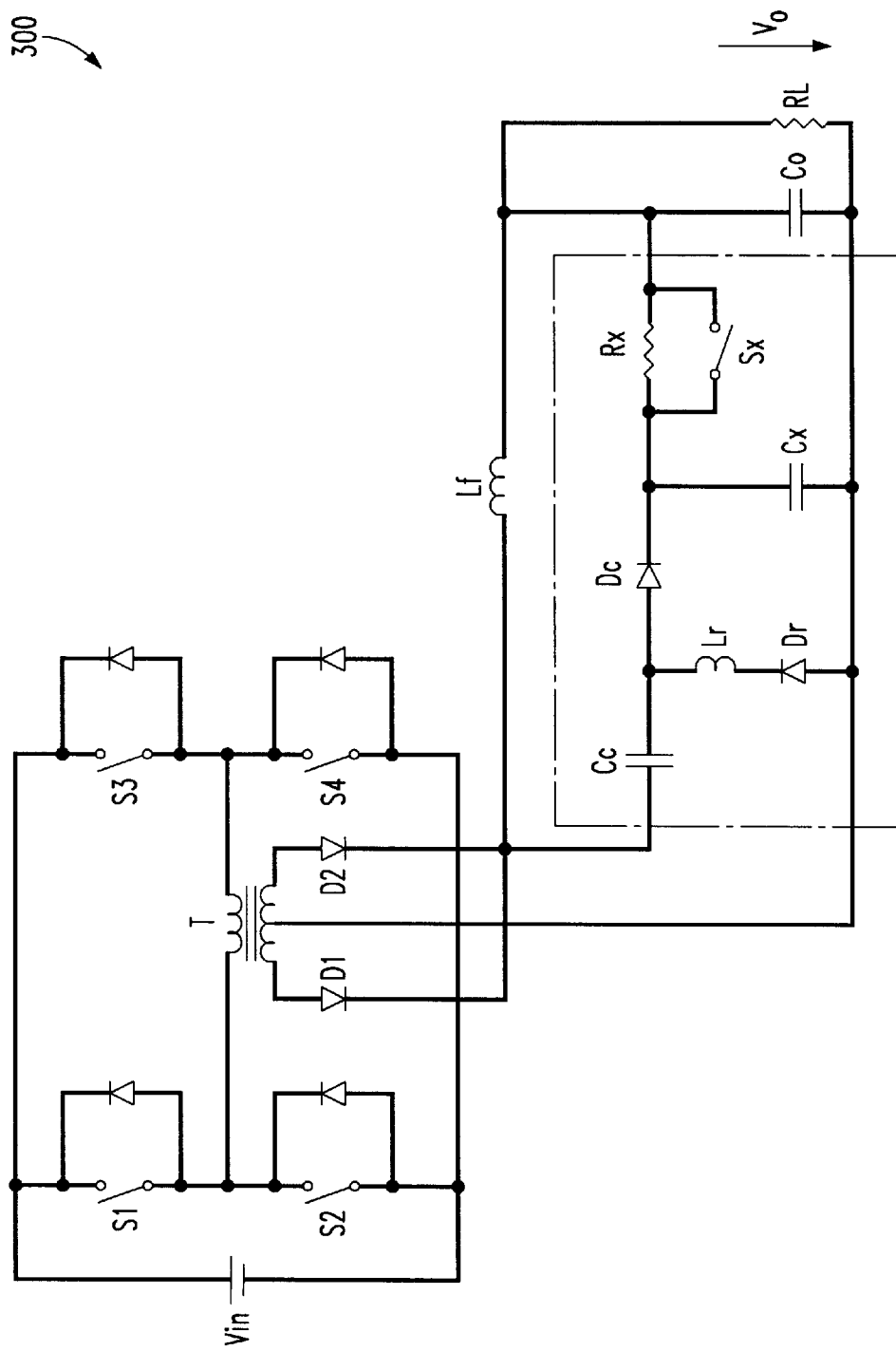
FIG. 3 illustrates a power converter with a snubber circuit and employing another embodiment of a reset circuit constructed according to the principles of the present invention.

Turning now to FIG. 3, illustrated is a power converter 300 with a snubber circuit and employing another embodiment of a reset circuit constructed according to the principles of the present invention. The power converter 300 includes an input inverter circuit including first, second, third and fourth switches S1, S2, S3, S4, respectively, a power transformer T, first and second rectifying diodes D1, D2, a filter inductor Lf, an output capacitor Co, a load resistor RL and a passive snubber circuit. The snubber circuit includes a snubber capacitor Cc, a snubber inductor Lr, a first snubber diode Dr and a second snubber diode Dc. The power converter still further includes a reset circuit including a reset capacitor Cx and an activation circuit having an activation circuit resistor Rx and an activation circuit bypass switch Sx. In the present embodiment, the activation circuit resistor Rx and the activation circuit bypass switch Sx are parallel-coupled.

When the output voltage of the power converter 300 is out of regulation (e.g., the output voltage is less than its rated output voltage), the activation circuit bypass switch Sx is open allowing the activation circuit resistor Rx to provide sufficient voltage across the reset capacitor Cx to fully reset the snubber inductor Lr. However, when the power converter 300 output voltage is within regulation, the activation circuit bypass switch Sx is closed thereby effectively removing the activation circuit resistor Rx and raising the power converter 300 efficiency accordingly. The activation circuit bypass switch Sx may be implemented using any switching device such as a semiconductor device or a mechanical relay.

Figure 4:
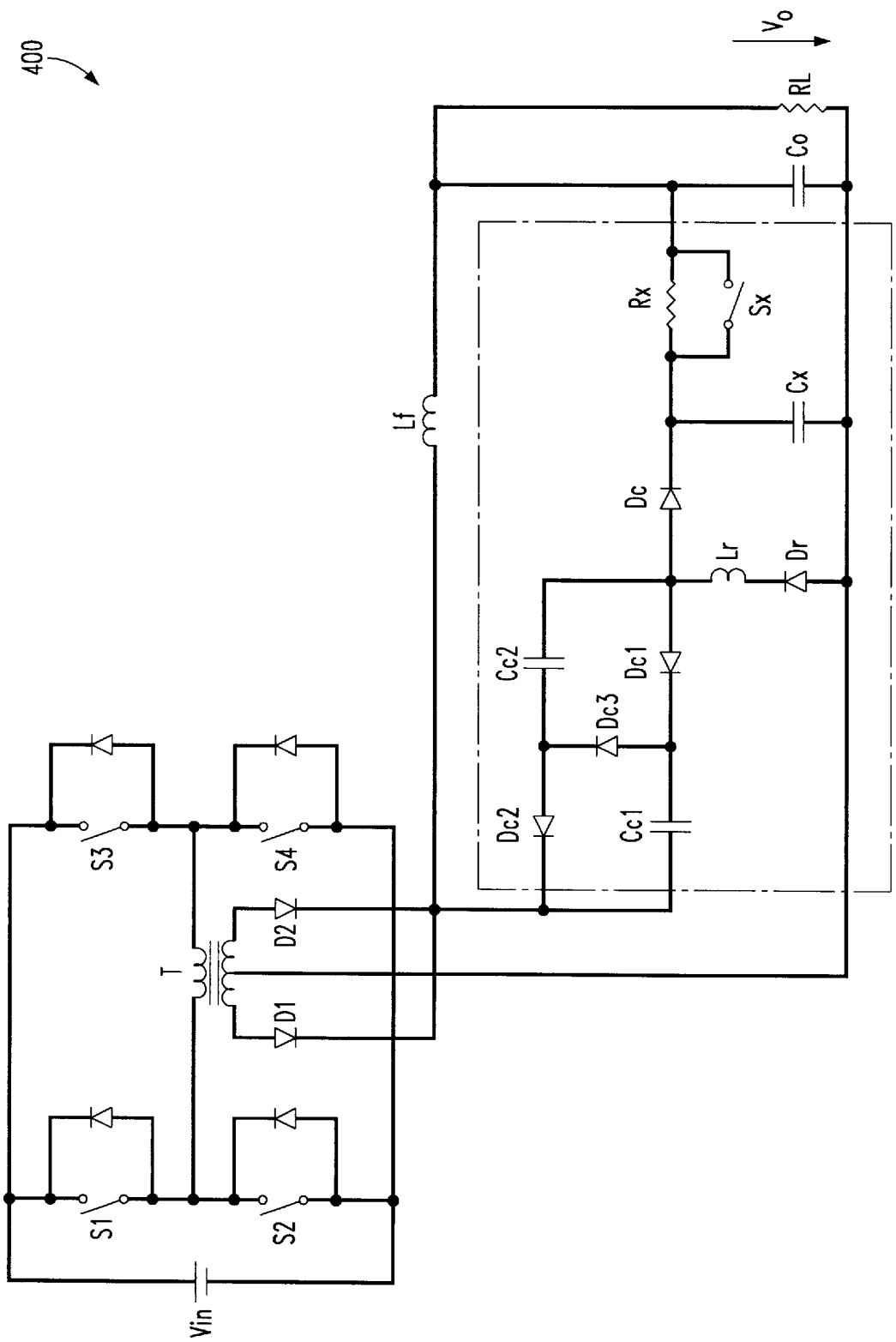
FIG. 4 illustrates a power converter with a snubber circuit and employing the reset circuit of FIG. 3.

Turning now to FIG. 4, illustrated is a power converter 430 with a snubber circuit and employing the reset circuit of FIG. 3. The power converter 400 includes an input inverter circuit including first, second, third and fourth switches S1, S2, S3, S4, respectively, a power transformer T, first and second rectifying diodes D1, D2, a filter inductor Lf, an output capacitor Co, a load resistor RL and a passive snubber circuit. The passive snubber circuit includes a voltage doubler circuit including first and second doubler capacitors Cc1, Cc2, first, second and third doubler diodes Dc1, Dc2, Dc3, a snubber inductor Lr, a first snubber diode Dr and a second snubber diode Dc. The power converter 400 also includes a reset circuit including a reset capacitor Cx and an activation circuit having an activation circuit resistor Rx and an activation circuit bypass switch Sx.

The voltage doubler circuit acts as a clamping circuit for the passive snubber circuit. In this topology, the clamping capacitor function is shared by the first and second doubler capacitors Cc1, Cc2. The voltage doubler circuit arrangement impresses only half the clamping voltage across the snubber inductor Lr. This feature allows the snubber inductor Lr to fully reset over a wider range of output voltages of the power converter 400 than the case of FIG. 3. Of course, the activation circuit bypass switch Sx is controlled to open before the output voltage drops to a level that would impede proper operation of the passive snubber circuit thereby endangering the rectifying diodes D1, D2.

Figure 5:
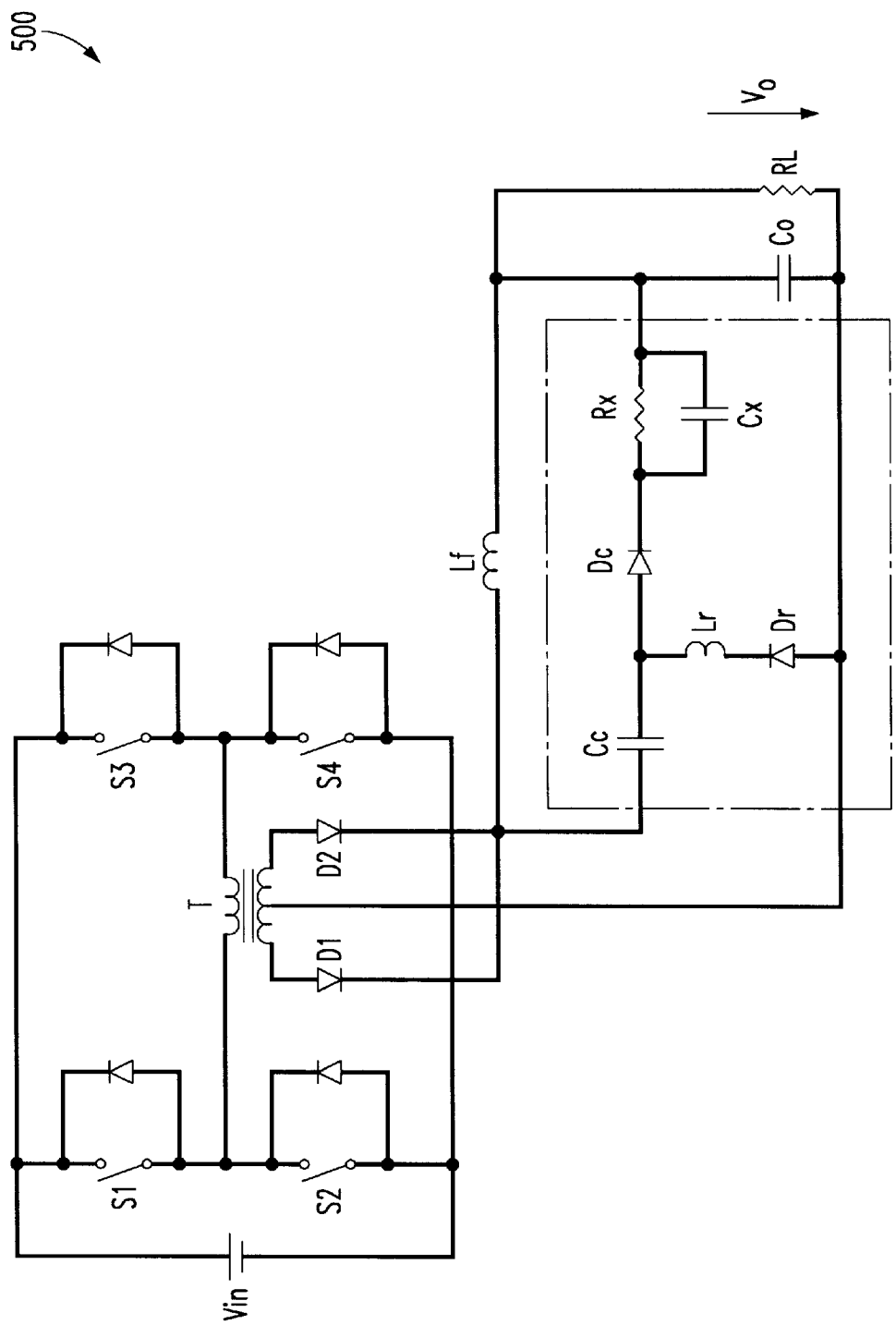
FIG. 5 illustrates a power converter with a snubber circuit and employing another embodiment of a reset circuit constructed according to the principles of the present invention.

Turning now to FIG. 5, illustrated is a power converter 500 with a snubber circuit and employing another embodiment of a reset circuit constructed according to the principles of the present invention. The power converter 500 includes an input inverter circuit including first, second, third and fourth switches S1, S2, S3, S4, respectively, a power transformer T, first and second rectifying diodes D1, D2, a filter inductor Lf, an output capacitor Co, a load resistor RL and a passive snubber circuit. The passive snubber circuit includes a snubber capacitor Cc, a snubber inductor Lr, a first snubber diode Dr and a second snubber diode Dc. The power converter 500 further includes a reset circuit including a reset capacitor Cx and an activation circuit having an activation circuit resistor Rx.

In this embodiment, the reset capacitor Cx is connected in parallel with the activation circuit resistor Rx. The output capacitor Co is typically large and affords essentially a low impedance path to the common return for AC signals. This feature allows the reset capacitor Cx and the activation circuit resistor Rx to operate in a manner analogous to the one depicted in the embodiment of FIG. 2.

Figure 6:
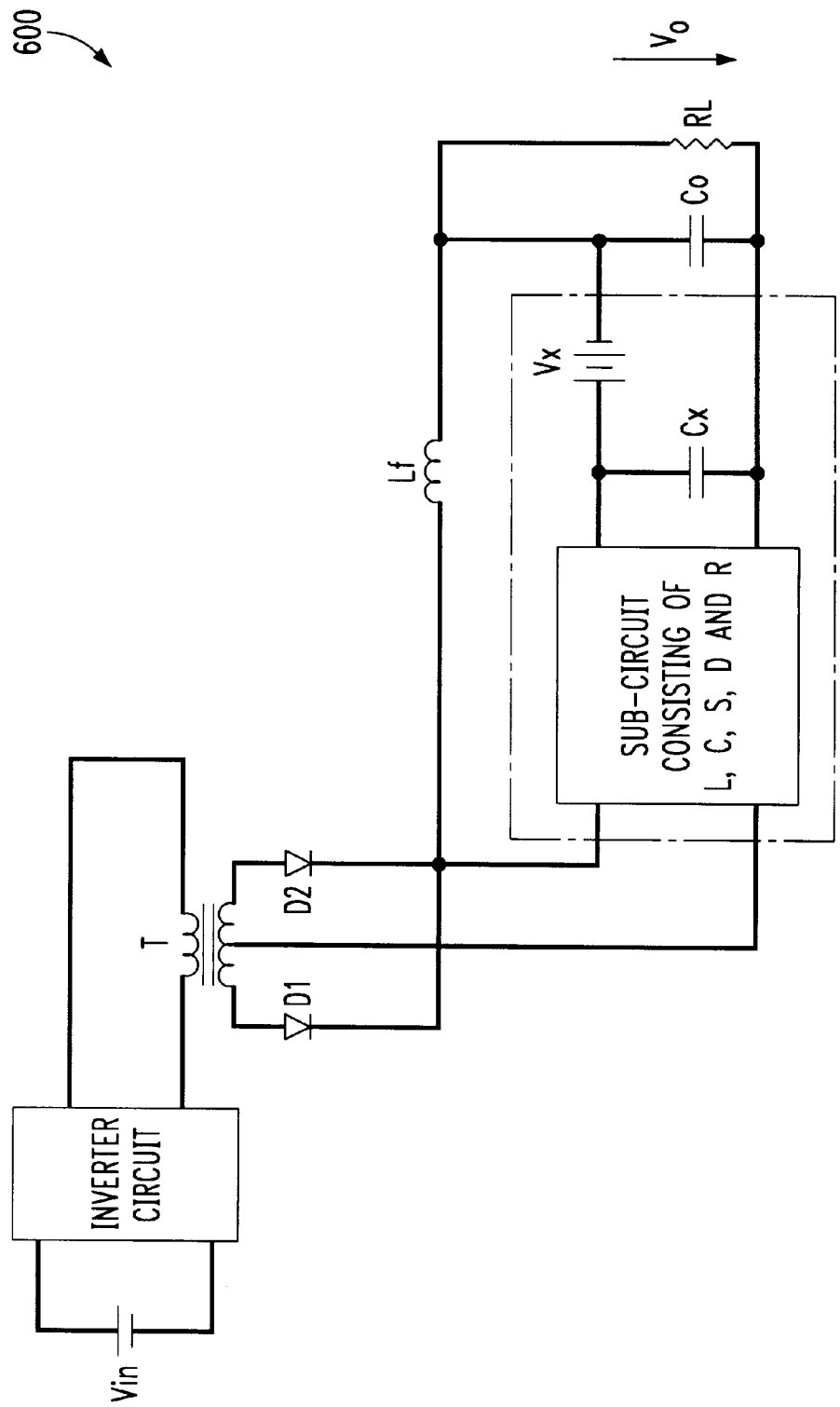
FIG. 6 illustrates a conceptual schematic diagram of a power converter constructed according to the principles of the present invention.

Turning now to FIG. 6, illustrated is a conceptual schematic diagram of a power converter 600 constructed according to the principles of the present invention. The power converter 600 includes an input inverter circuit including first, second, third and fourth switches S1, S2, S3, S4, respectively, a power transformer T, first and second rectifying diodes D1, D2, a filter inductor Lf, an output capacitor Co, a load resistor RL and a snubber circuit. The snubber circuit generally includes a combination, or individual ones, of a snubber capacitor C, a snubber inductor L, a snubber switch S, a snubber diode D and a snubber resistor R. The power converter 500 also includes a reset circuit including a reset capacitor Cx and an activation circuit (represented by a voltage source Vx).

The activation circuit Vx is shown to be an idealized battery which provides an electromotive force with an internal impedance of zero. This embodiment shows a general approach to increasing the resetting voltage for the snubber inductor L without penalizing the converter efficiency under normal output voltage conditions. Of course, any voltage source may be employed in the circuit as shown. However, a more practical solution may employ the use of zener or other diodes, which are selected to have low internal impedances.

While specific embodiments of a power converter, snubber circuit and reset circuit and method of resetting a storage element of the snubber circuit have been illustrated and described, other embodiments are well within the broad scope of the present invention. Additionally, although a center-tap rectifier circuit is shown in the above embodiments, the principles of the invention may be applied to other rectifier arrangements including bridge rectifiers or current doubler circuits. Also, the principles can be applied to other converter topologies such as half-bridge, push-pull, forward or flyback. For a better understanding of switching power supplies, in general, see "Principles of Power Electronics" by John G. Kassakian, et al., Addison Wesley, Inc. (1991), and for snubber circuits, see, which are incorporated herein by reference.

Although the present invention has been described in detail, those skilled in the art should understand that they can make various changes, substitutions and alterations herein without departing from the spirit and scope of the invention in its broadest form.

What is claimed is:

1. For use in a power supply having a rectifying diode and a snubber circuit that includes a snubber inductor for absorbing a portion of a reverse recovery current associated with said rectifying diode, a circuit for resetting said snubber inductor, comprising:
    a reset capacitor, coupled to said snubber inductor, that has sufficient capacity to impress a resetting voltage across said snubber inductor; and
    an activation circuit, coupled between said reset capacitor and an output of said power supply and including a resistive element, that creates a voltage differential between said reset capacitor and said output to allow said reset capacitor to attain said resetting voltage.

2. The circuit as recited in claim 1 wherein said resistive element is a resistor.

3. The circuit as recited in claim 2 wherein said activation circuit further comprises a bypass switch parallel-coupled to said resistor.

4. The circuit as recited in claim 1 wherein said snubber circuit further comprises a snubber capacitor that recovers energy stored in said snubber inductor to said output.

5. The circuit as recited in claim 1 wherein said snubber circuit further comprises a plurality of snubber capacitors that recover energy stored in said snubber inductor to said output.

6. The circuit as recited in claim 1 wherein said snubber circuit further comprises first and second snubber diodes coupled to said snubber inductor.

7. The circuit as recited in claim 1 wherein said power supply further comprises a plurality of rectifying diodes and said snubber circuit moderates reverse recovery currents associated with said plurality of rectifying diodes.

8. The circuit as recited in claim 1 wherein said power supply further comprises an output capacitor coupled to said output, said activation circuit creating said voltage differential between said reset capacitor and said output capacitor.

9. The circuit as recited in claim 1 wherein said resistive element is a non-linear element that produces a voltage drop when passing a current.

10. For use in a power supply having a rectifying diode and a snubber circuit that includes a snubber inductor for absorbing a portion of a reverse recovery current associated with said rectifying diode, a method of resetting said snubber inductor, comprising:
    resetting said snubber inductor with a reset capacitor, coupled to said snubber inductor, of sufficient capacity to impress a resetting voltage across said snubber inductor; and
    employing an activation circuit, between said reset capacitor and an output of said power supply and including a resistive element, to create a voltage differential between said reset capacitor and said output to allow said reset capacitor to attain said resetting voltage.

11. The method as recited in claim 10 wherein said resistive element is a non-linear element that produces a voltage drop when passing a current.

12. The method as recited in claim 10 further comprising recovering energy stored in said snubber inductor to said output.

13. The method as recited in claim 10 further comprising using a plurality of snubber capacitors that recover energy stored in said snubber inductor to said output.

14. The method as recited in claim 10 further comprising coupling first and second snubber diodes to said snubber inductor.

15. The method as recited in claim 10 wherein said power supply comprises a plurality of rectifying diodes, said snubber circuit moderating reverse recovery currents associated with said plurality of rectifying diodes.

16. The method as recited in claim 10 wherein said power supply comprises an output capacitor coupled to said output, said activation circuit creating said voltage differential between said reset capacitor and said output capacitor.

17. The method as recited in claim 10 wherein said resistive element is a resistor.

18. The method as recited in claim 17 wherein said activation circuit further comprises a bypass switch parallel-coupled to said resistor.

19. A power supply having an input and an output, comprising:
    a power switch, coupled to said input, that impresses forward currents through said power supply;
    a rectifying diode, coupled to said power switch, that is subject to reverse recovery currents;
    a snubber circuit that includes a snubber inductor for absorbing a portion of said reverse recovery currents; and
    a reset circuit, coupled to said snubber circuit, including:
        a reset capacitor coupled to said snubber inductor, for impressing a resetting voltage across said snubber inductor; and
        an activation circuit, coupled between said reset capacitor and said output and including a resistive element, allowing said reset capacitor to attain said resetting voltage.

20. The power supply as recited in claim 19 wherein said snubber circuit comprises a snubber capacitor that recovers energy stored in said snubber inductor to said output.

21. The power supply as recited in claim 19 wherein said snubber circuit comprises a plurality of snubber capacitors that recover energy stored in said snubber inductor to said output.

22. The power supply as recited in claim 19 wherein said snubber circuit comprises first and second snubber diodes coupled to said snubber inductor.

23. The power supply as recited in claim 19 further comprising a plurality of rectifying diodes and said snubber circuit moderates reverse recovery currents associated with said plurality of rectifying diodes.

24. The power supply as recited in claim 19 further comprising an output capacitor coupled to said output, said activation circuit creating said voltage differential between said reset capacitor and said output capacitor.

25. The power supply as recited in claim 19 wherein said resistive element is a resistor.

26. The power supply as recited in claim 25 wherein said activation circuit further comprises a bypass switch parallel-coupled to said resistor.

27. The power supply as recited in claim 19 wherein said resistive element is a non-linear element that produces a voltage drop when passing a current.

* * * * *